June 6, 1933.  A. W. LEMMON  1,912,647
CUSHIONING MEANS FOR TROLLEY CONVEYERS
Filed March 30, 1932
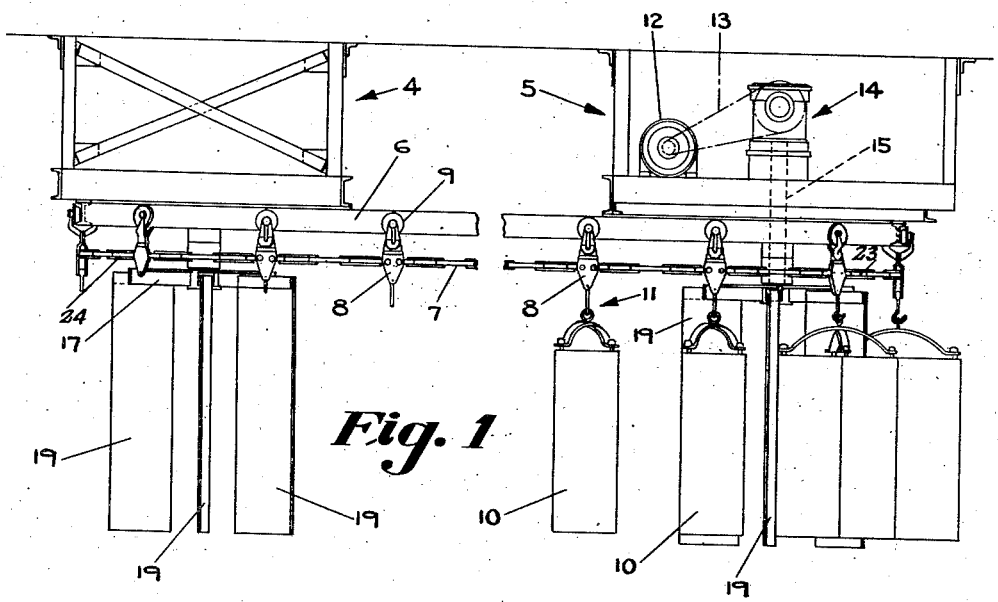
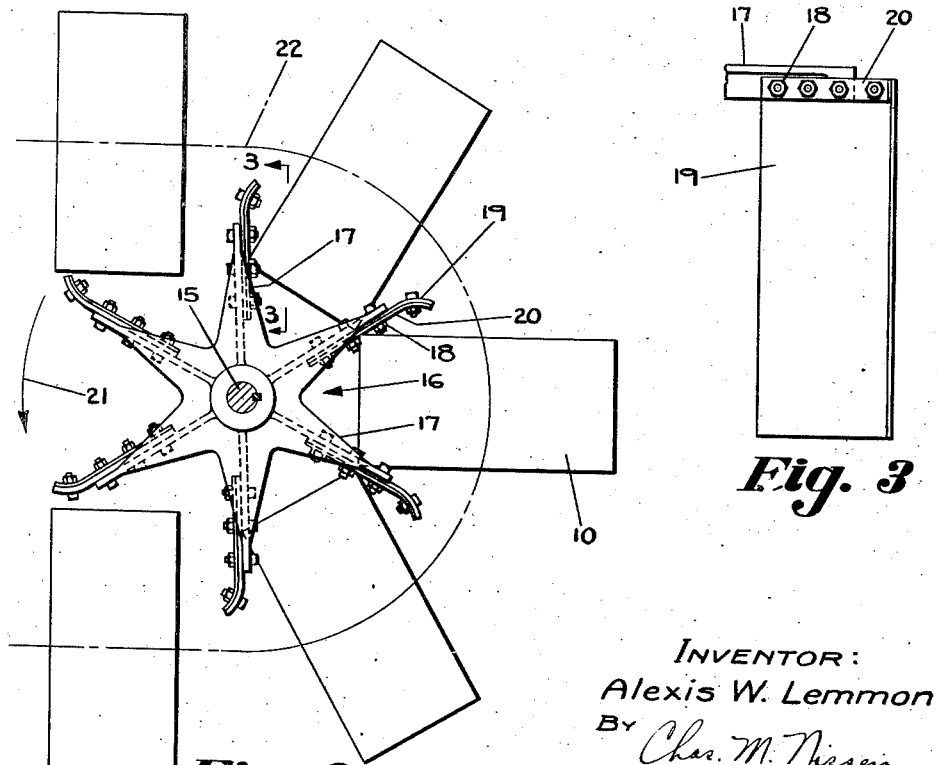
INVENTOR:
Alexis W. Lemmon
By Chas. M. Nissen,
ATT'Y.

Patented June 6, 1933

1,912,647

UNITED STATES PATENT OFFICE

ALEXIS W. LEMMON, OF COLUMBUS, OHIO, ASSIGNOR TO THE JEFFREY MANUFACTURING COMPANY, A CORPORATION OF OHIO

CUSHIONING MEANS FOR TROLLEY CONVEYERS

Application filed March 30, 1932. Serial No. 601,983.

My invention relates to apparatus for protecting articles conveyed by travelling conveyer apparatus, and although it is particularly adapted for use in connection with trolley conveyer apparatus, it should be understood that it may have a general application.

One of the objects of the present invention is the provision of cushioning blades or sheets mounted for positioning between articles being moved around curved paths of conveyer apparatus.

More particularly it is the object of my invention to provide for the interposition of cushioning material between articles while being conveyed so as to prevent contact between the articles, and thereby avoid injury by impact between adjacent articles while being conveyed.

Other objects of the invention will appear hereinafter, the novel features and combinations being set forth in the appended claims.

In the accompanying drawing Fig. 1 illustrates trolley conveyer apparatus embodying my invention.

Fig. 2 is a plan view of mechanism for carrying cushioning blades in position to separate articles while being carried by a trolley conveyer around a curved path.

Fig. 3 is an elevational view taken along line 3—3 in Fig. 2 of one of the cushioning blades attached to an arm broken away from the spider support or rotary carrier shown in Fig. 2.

In Fig. 1 supporting frame-work is shown at 4 and 5 for supporting the I-beam 6 which forms a track for the trolley conveyer comprising the driving chain 7, the hangers 8 and the trolley wheels 9. The hangers 8 are connected at intervals to the chain 7 in position to carry in suspended position the articles 10 by means of the suspending connections 11.

For the sake of economy in the handling of the articles by means of the trolley conveyer apparatus, the hangers are spaced as closely together as the nature of the articles will permit without their coming into contact with each other. When the articles are carried around curved paths, however, they are brought into such close relation that they may contact with each other, and by reason of the rapidity of the travel of the articles the impact of contact may be sufficient, in many instances, to cause marring of or injury to the articles being conveyed.

The curved paths of the trolley conveyer hangers may be around a driving sprocket through an arc of 180° or less and also around guiding sprockets or guiding grooves. For instance, the trolley conveyer illustrated in Fig. 1 may be a long loop, the right-hand end of which comprises a driving chain meshing with a driving sprocket 23, and the left-hand end of which comprises a driving chain extending around an idler sprocket 24.

In Fig. 1 a motor 12 is shown connected by a sprocket chain 13 to the mechanism 14 for driving a vertical shaft 15 connected to the sprocket which meshes with the right-hand end of the loop of the driving chain 7.

Mounted on the shaft 15, as shown in Fig. 2, is a supporting spider or carrier 16 having a plurality of radial arms 17, 17 to which may be bolted, as shown at 18 in Fig. 3, vertical rectangular plates 19, or sheets of resilient or cushioning material.

In Fig. 2, which is a plan view of the spider supporting structure or rotary carrier, the plates or sheets 19 may be connected at their upper ends to metal strips 20 so as to be curved at those portions distant from the axis of rotation, with the concave side opposite to the direction of rotation of the spider, indicated by the arrow 21. The articles 10 are illustrated in the positions which they will assume when travelling around the curved path as defined by the path of the conveyer chain illustrated by the broken line 22 in Fig. 2.

As illustrated in Figs. 1 and 3, the cushioning blades 19 are of sufficient length to prevent contact between either the upper portions or the lower portions of the articles 10 being conveyed by the trolley conveyer apparatus. Aside from being made of various dimensions, including length, width and thickness, the cushioning blades or sheets may also be made of various shapes. The nature of the material of which the cushioning blades or sheets are made will depend upon the nature of the articles being conveyed. For instance, if the articles are metal the cushioning blades may be composed of wood, fiber, or other material which is soft relative to the metal articles. If the articles being conveyed are provided with a finishing polish, such as varnish or other material, and marring between the finished articles is to be avoided, the cushioning sheets or blades may be composed of such soft cushioning material as rubber, leather, or sheets of soft composition.

Obviously those skilled in the art may make various changes in the details and arrangement of parts without departing from the spirit and scope of the invention as defined by the claims hereto appended and I wish therefore not to be restricted to the precise construction herein disclosed.

Having thus disclosed an embodiment of the invention, what I claim and desire to secure by Letters Patent is:

1. In a conveyer system, the combination with a trolley conveyer having means for suspending articles at intervals, of a rotary carrier at a curve in the conveyer, and a cushion on said carrier in position to separate adjacent articles supended from said conveyer.

2. In a conveyer system, the combination with a conveyer, of a carrier at a curve in the conveyer, and means on the carrier in position to separate adjacent articles on said conveyer.

3. In a conveyer system, the combination with a traveling conveyer, of a rotary carrier, spaced apart radial separators on said carrier in position to intervene next adjacent articles operated on by said conveyer, and means for driving said conveyer.

4. In a conveyer system, the combination with a trolley conveyer, of a sprocket at a curve in the path of the conveyer and mounted on a vertical axis, a carrier connected to said sprocket to rotate therewith, and a plurality of spaced-apart cushioning sheets mounted on said carrier.

5. In a conveyer system, the combination with a traveling conveyer comprising a chain and a sprocket meshing therewith, of a carrier connected to said sprocket to be rotated thereby, and a plurality of spaced-apart separators on said carrier in position to prevent contact between adjacent articles moved by said conveyer.

6. In a conveyer system, the combination with a travelling conveyer comprising a chain and a sprocket meshing therewith, said sprocket being mounted for rotation on an upright axis, of a carrier connected to said sprocket to be driven thereby, and cushioning separators suspended radially at intervals from said carrier in position to extend between adjacent articles suspended from said trolley conveyer.

7. In a conveyer system, the combination with a trolley conveyer comprising a chain and a sprocket in mesh therewith, of a rotary carrier connected concentrically to said carrier to rotate therewith, and a plurality of radial cushioning separators suspended at intervals from said carrier.

8. In a conveyer system, the combination with a trolley conveyer comprising a sprocket with a chain meshing therewith and hangers connected at intervals to said chain, of a rotary carrier connected to said sprocket to rotate therewith, and cushioning separators mounted on said carrier to alternate with the hangers as they travel around said sprocket.

9. In a conveyer system, the combination with a trolley conveyer, of a rotary spider at a curve in the path of said conveyer, said spider comprising a plurality of radial arms, separators of cushioning material adapted to be suspended between articles supported by said conveyer, and means for detachably securing said separators to the arms of said spider.

In testimony whereof I have signed my name to this specification on this 28th day of March A. D. 1932.

ALEXIS W. LEMMON.